US009304707B1

(12) United States Patent
Helsley et al.

(10) Patent No.: US 9,304,707 B1
(45) Date of Patent: Apr. 5, 2016

(54) TRANSFERRING HIGH VOLUME DATA BETWEEN OPERATING SYSTEMS

(71) Applicants: David Helsley, Glastonbury, CT (US); Lawrence Lee, Chino Hills, CA (US)

(72) Inventors: David Helsley, Glastonbury, CT (US); Lawrence Lee, Chino Hills, CA (US)

(73) Assignee: CA, Inc., New York, NY (US)

( * ) Notice: Subject to any disclaimer, the term of this patent is extended or adjusted under 35 U.S.C. 154(b) by 260 days.

(21) Appl. No.: 14/067,396

(22) Filed: Oct. 30, 2013

(51) Int. Cl.
*G06F 12/00* (2006.01)
*G06F 3/06* (2006.01)

(52) U.S. Cl.
CPC ............ *G06F 3/0655* (2013.01); *G06F 3/0619* (2013.01); *G06F 3/0659* (2013.01); *G06F 3/0674* (2013.01)

(58) Field of Classification Search
CPC ...... G06F 3/064; G06F 3/0656; G06F 3/0659
USPC ........................................................ 711/162
See application file for complete search history.

(56) References Cited

U.S. PATENT DOCUMENTS

| | | | | | |
|---|---|---|---|---|---|
| 5,369,750 | A | * | 11/1994 | Inoue | G06F 12/0284 711/202 |
| 5,742,792 | A | * | 4/1998 | Yanai | G06F 3/0601 710/1 |
| 5,761,531 | A | * | 6/1998 | Ohmura | G06F 11/1666 710/21 |
| 7,444,493 | B2 | * | 10/2008 | Schoinas | G06F 12/1009 711/117 |
| 2005/0268071 | A1 | * | 12/2005 | Blandy | G06F 12/08 711/208 |
| 2005/0268298 | A1 | * | 12/2005 | Hunt | G06F 9/4856 718/1 |
| 2011/0173615 | A1 | * | 7/2011 | Easton | G06F 12/109 718/1 |
| 2014/0089540 | A1 | * | 3/2014 | Tsukada | G06F 3/0601 710/74 |

OTHER PUBLICATIONS

CA Technologies, CA Vtape Virtual Tape System r12.5 Product Sheet, 2010.

* cited by examiner

*Primary Examiner* — Prasith Thammavong
(74) *Attorney, Agent, or Firm* — Baker Botts L.L.P.

(57) ABSTRACT

A method includes receiving, at a logical partition, a series of messages. Each message in the series of messages includes a respective block of data. The method further includes, in response to receiving the first message of the series of messages, suspending further processing of the series of messages. The method also includes identifying, from a header of the first message, a respective buffer address for each block of data. The method still further includes resuming processing of the series of messages. The method additionally includes, for each respective block of data, storing the respective block of data at the respective buffer address, and transferring the respective block of data from the corresponding buffer address to an open storage disk.

20 Claims, 7 Drawing Sheets

TRANSFERRING HIGH VOLUME DATA BETWEEN OPERATING SYSTEMS

BACKGROUND

The disclosure relates generally to high volume data management, and specifically to transferring high volume data between operating systems.

SUMMARY

According to one embodiment of the disclosure, a method includes receiving, at a logical partition, a series of messages. Each message in the series of messages includes a respective block of data. The method further includes, in response to receiving the first message of the series of messages, suspending further processing of the series of messages. The method also includes identifying, from a header of the first message, a respective buffer address for each block of data. The method still further includes resuming processing of the series of messages. The method additionally includes, for each respective block of data, storing the respective block of data at the respective buffer address, and transferring the respective block of data from the corresponding buffer address to an open storage disk.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
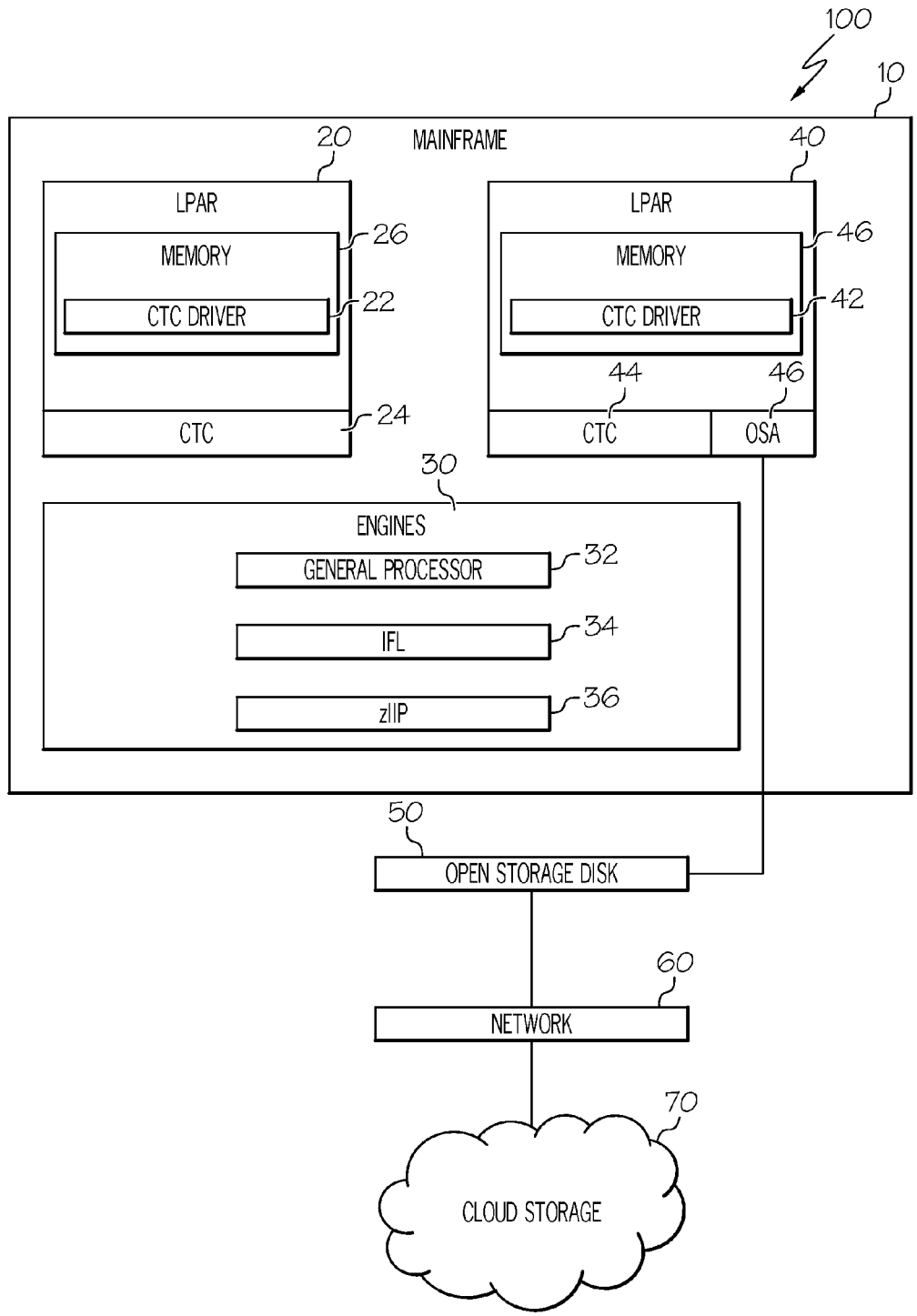
FIG. 1 illustrates a block diagram of a system for transferring high volume data between operating systems in accordance with a particular non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN®2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

IT administrators use virtual tape systems to improve backup and recovery times, provide lower operating costs, and improve hardware flexibility. Virtual tape systems enable these improvements by using data storage virtualization technology. For example, virtual tape systems include archive storage systems that mimic physical tape data backup and archive processes and use a variety of physical and virtual disk media for storage. Thus, systems may write backup data as if writing it to a physical tape, while the underlying disk being written to may vary. Virtual tape cloud storage systems include virtual tape systems where the ultimate destination of the backup data is a public, private, hybrid, or some other type of cloud computing environment. For example, data may be backed up to an appliance that processes and/or massages the data and backs it up to a cloud environment.

Certain embodiments of the present disclosure may enable virtual tape systems to write virtual tape volumes to open storage disk format devices with minimal overhead by sending data from one partition to a second partition via a channel-to-channel ("CTC") connection and using the second partition to back up the data to an open storage disk. For example, a z/OS partition transfers data to a zLinux partition over a CTC connection. Once data is transferred to the zLinux partition, it may be directly written to one or more open storage disk devices using normal input/output hardware accessible via the zLinux partition. The zLinux partition may have better access to less expensive and/or more suitable engines, processors, and other hardware and virtual components. Buffering the data transferred to the zLinux partition may be minimized by bonding multiple CTC addresses together to appear as one connection that may provide high throughput and reliability on the zLinux side, while minimizing general CPU consumption.

In certain embodiments, the teachings of the present disclosure may be applied to a virtual tape cloud storage system, or any other storage system. For example, a z/OS partition transfers data to a zLinux partition over a CTC connection. Once the data is transferred, it is directly written to an appliance. The appliance may compress, de-duplicate, and optimize the data before sending it to a hard-disk, tape, virtual disk, cloud, or other storage environment.

Referring to FIG. 1, a block diagram of a system for transferring high-volume data between operating systems is illustrated in accordance with a particular non-limiting embodiment of the present disclosure. The example illustrated in FIG. 1 includes a mainframe system 10 with two logical partitions, i.e., LPAR 20 and LPAR 40, and a set of engines 30 including general processor(s) 32, integrated for Linux engine ("IFL") 34, and System z integrated information processor ("zIIP") 36. LPAR 20 and LPAR 40 each have a memory running a CTC driver program for controlling the flow of data sent through the CTC connections 24 and 44. LPAR 20 may, by default, use primarily general processor 32 for high volume data transfers. LPAR 40 includes an open systems adapter ("OSA"), i.e., OSA 46, as a network controller that connects to an open storage disk 50 on network 60. Open storage disk 50 may be an appliance for backing up large amounts of data to cloud storage 70.

In certain embodiments, LPAR 40 CTC driver 42 is programmed to receive data from LPAR 20 and store it in buffer addresses. The buffer addresses are selected by CTC drivers 22 and 42 to reduce the number of processing operations required to buffer the data for export to open storage disk 50.

In certain embodiments, LPAR 20 may not be capable of communicating with open storage disk 50. In certain embodiments, LPAR 20 may be capable of sending data to open storage disk 50, but may do so using general processor 32.

General processor 32 may be more expensive than other special purpose engines such as IFL 34 and zIIP 36. For example, a user may be billed based on a time of use or a utilization rate for general processor 32.

Traditional backup techniques may back up data directly from LPAR 20 to open storage disk 50. However, such operations may be more expensive than programming driver code, such as CTC drivers 22 and 42, to utilize special purpose engines for large data transfers.

Traditional backup techniques may backup data from LPAR 20 directly to a tape drive via CTC 24. Large scale backup operations to a tape drive may not be cost effective due to new advancements in data storage technologies. For example, robotic arms for changing tapes and custom systems for storing physical tape drives may be expensive. An IT administrator may prefer to use a cloud backup and storage solution instead of investing the up-front capital expenditure to create the infrastructure required for traditional storage techniques.

In certain embodiments, open storage disk 50 may be included in a backup and/or restore appliance. Such an appliance may have capabilities such as data deduplication capabilities that reduce the amount of data transferred over the network to a cloud storage facility. Such an appliance may further have local storage, data compression, data de-duplication, and data encryption capabilities, as well as provide access to public cloud storage facilities.

Figure 2:
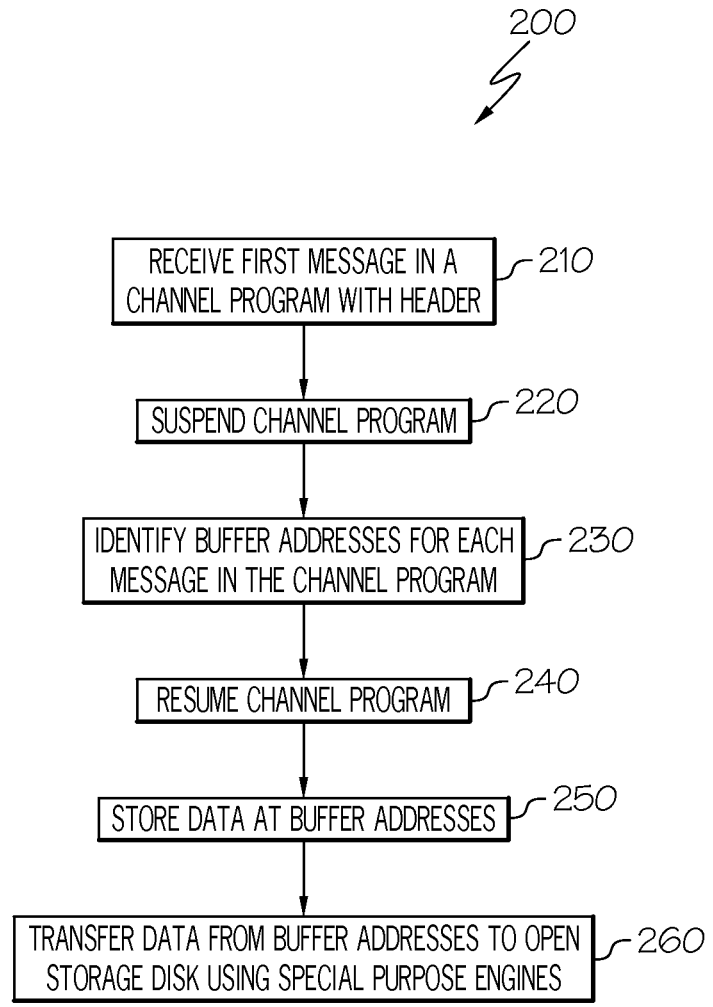
FIG. 2 illustrates a flowchart of a method for transferring high volume data between operating systems in accordance with a particular non-limiting embodiment of the present disclosure.

Referring to FIG. 2, a flowchart of a method for transferring high-volume data between operating systems is illustrated in accordance with a particular non-limiting embodiment of the present disclosure. In step 210, a first message in a channel program is received at a first LPAR using a channel-to-channel connection from a second LPAR. In certain embodiments, the channel program is suspended upon receipt of the first message. For example, header information in the command channel word ("CCW") may cause an interrupt in execution at the CTC connection. A CTC driver loaded in the first LPAR's memory may control channel program execution.

In certain embodiments, the header for the first CCW may contain instructions. The CTC driver may read the instructions and interrupt processing of the channel program to read the instructions. The CCW may include a body containing data. The CCW may also include a reference to a next CCW in a series of CCW's being sent to the first LPAR from the second LPAR. In certain embodiments, these CCW's may be chained together.

In step 220, the channel program is suspended. In certain embodiments, the CTC driver may read the remainder of the CCW header. The header for the first CCW may subsequently contain buffer addresses. The buffer addresses may correspond to memory buffer addresses present on the first LPAR. The buffer addresses may correspond to the first and following CCW's. For example, the buffer addresses may indicate buffer addresses on LPAR 1 that may store the body of the CCW's being sent from LPAR 2.

In step 230, the CTC driver reads all the buffer addresses and identifies the corresponding CCW's for each buffer address.

In step 240, the CTC driver may next process a resume subchannel command ("RSCH"). This command may cause the CTC address and/or CTC driver to resume the channel program. This command may direct the CTC address where the first CCW was received to read in the remainder of the CCW's identified in the header and store the data from the bodies of those CCW's in the corresponding buffer addresses as specified in the header. In certain embodiments, the CTC address may do this without interruption after the interruptions caused during the processing of the CTC header.

In step 250, data received in the body of the following chained CCW's is stored in the corresponding buffer addresses on the first LPAR. Such corresponding buffer addresses may be convenient buffer addresses for further data export operations, such as data export operations to a network file system or cloud storage appliance. For example, the data may be exported directly from the memory addresses without any caching, buffering, rebuffering or moving of the data blocks from the buffer addresses specified in the header of the first CCW. Thus, the data may be exported to a network device and/or appliance more efficiently than existing methods.

In step 260, data is transferred from the buffer addresses to an open storage disk using special purpose engines. In certain embodiments, the process may be completed using IFL's. In certain embodiments, zIIP's may be used. Those of ordinary skill in the art will appreciate the benefit of using special purpose engines instead of general processors is that special purpose engines may be less expensive, and utilization-based billing systems may charge less for the use of special purpose engines than for use of general processors.

In certain embodiments, if buffering or caching of the data is required on the first LPAR, the processing may be completed by special purpose engines. In certain embodiments, the first LPAR may be a Linux on z partition and the second LPAR may be a z/OS partition.

In certain embodiments, data archive and transfer techniques implemented on z/OS partitions may require use of general processors. Such use may become expensive and costly for high-volume data transfers such as system backups. For example, virtual tape drives may use general processors to backup data from z/OS partitions to virtual tape storage devices and/or open storage disks.

In certain embodiments, CTC drivers may be configured to specify use of special purpose engines for data transfer processes.

Figure 3A:
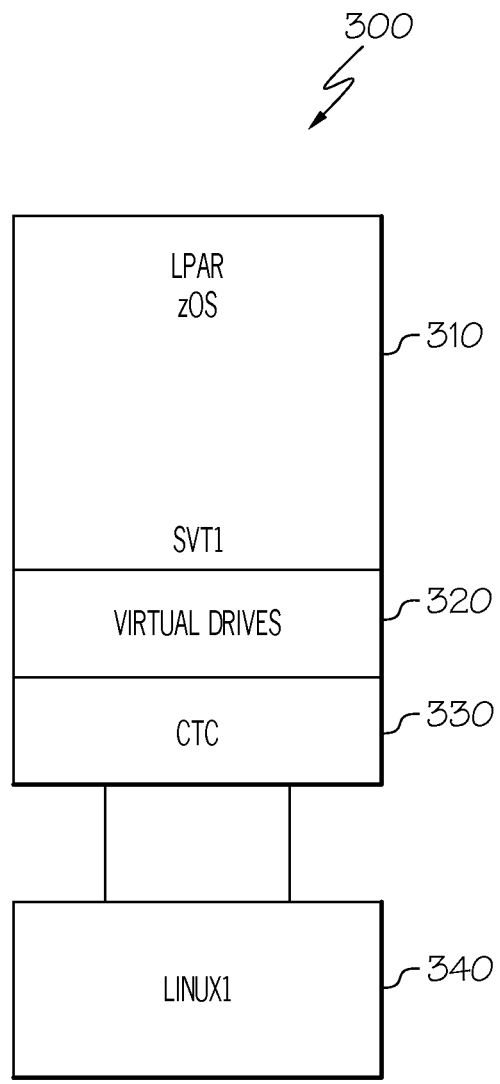
FIG. 3A illustrates a block diagram of a system for transferring high volume data between a z/OS logical partition and a Linux on z host in accordance with a particular non-limiting embodiment of the present disclosure.
Figure 3B:
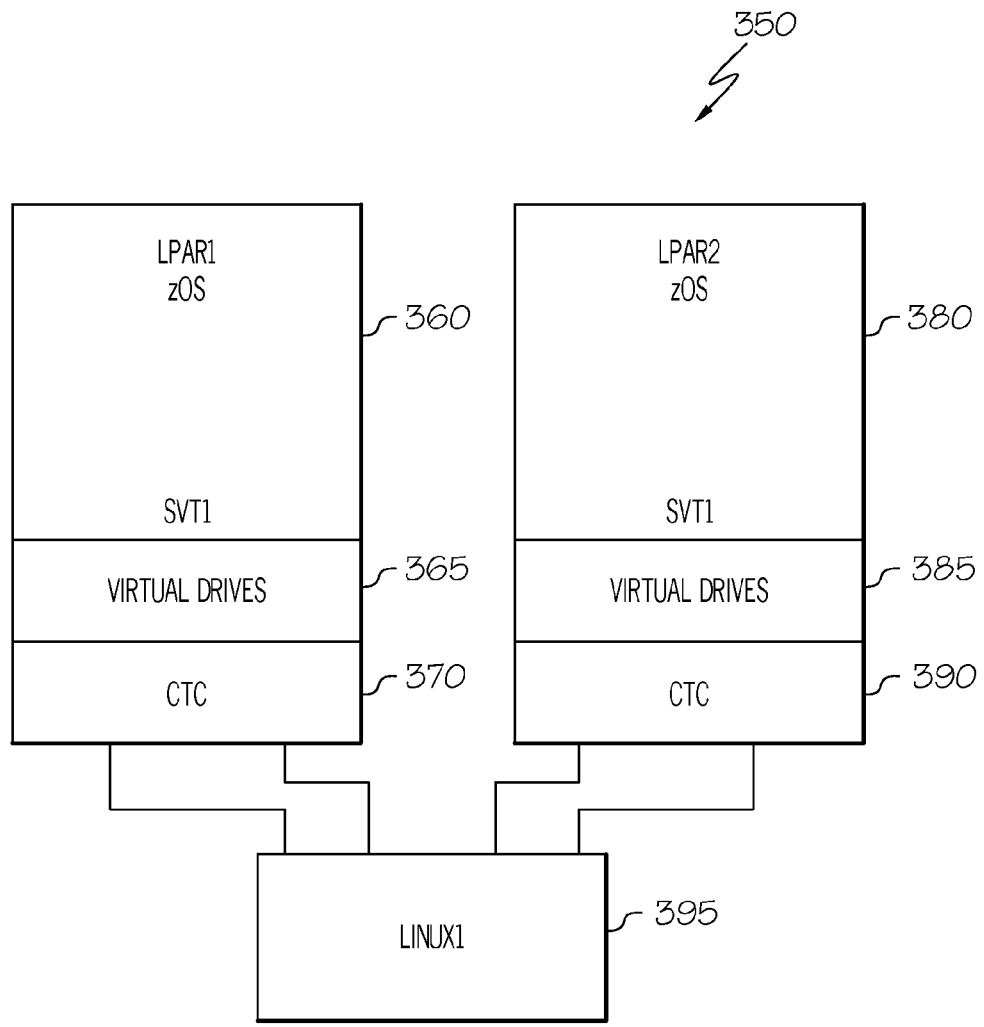
FIG. 3B illustrates a block diagram of a system for transferring high volume data between two z/OS logical partitions and a Linux on z host in accordance with a particular non-limiting embodiment of the present disclosure.

Referring to FIGS. 3A and 3B, two block diagrams of logical partitions on a System z device are illustrated in accordance with a particular non-limiting embodiment of the present disclosure. FIG. 3A illustrates an example of a z/OS logical partition communicating to a Linux on z host. FIG. 3B illustrates an example of two z/OS logical partitions communicating with a Linux on z host.

In certain embodiments, the CTC adapter may be an input/output ("I/O") device used by a program in one system to communicate with a program in another system. Cloud storage systems may use CTC adapters to communicate between virtual tape solutions and an application server running on Linux on z. CTC connections may move data between hosts quickly. CTC connections may also use less general processer resources.

Customers that have at least one fibre connection ("FICON") channel connected to the I/O fabric may have CTC connections set up at no additional cost. Customers may no longer need to dedicate channel path ("CHPID") resources to the CTC function. CTC connections between channels may be made by going through a FICON Director. The CTC adapter function may be implemented logically between connecting channels and may reside in the FICON channel.

In certain embodiments, a FICON channel with CTC capability may behave as a standard FICON channel connecting to standard FICON I/O control units. The FICON channel with CTC capability may also have an internal CTC control unit function that supports CTC connections. Unlike ESCON, no special channel type may be accessible. Certain embodiments only require that a new control unit type ("FCTC") be specified to an input/output configuration program ("IOCP") and/or hardware configuration definition ("HCD") in the control unit definition.

Channels at either or both ends of a CTC connection can be shared or unshared. If a processor complex is running in LPAR mode, its logical partitions can share channel paths to reduce the number of physical connections between processor complexes.

In certain embodiments, cloud storage systems combine multiple CTC addresses between hosts to facilitate multiplexing read and write operations on behalf of a variable number of virtual tape drives. Cloud storage systems may require two CTC addresses between each instance of virtual tape software on z/OS and Linux on z.

Figure 4:
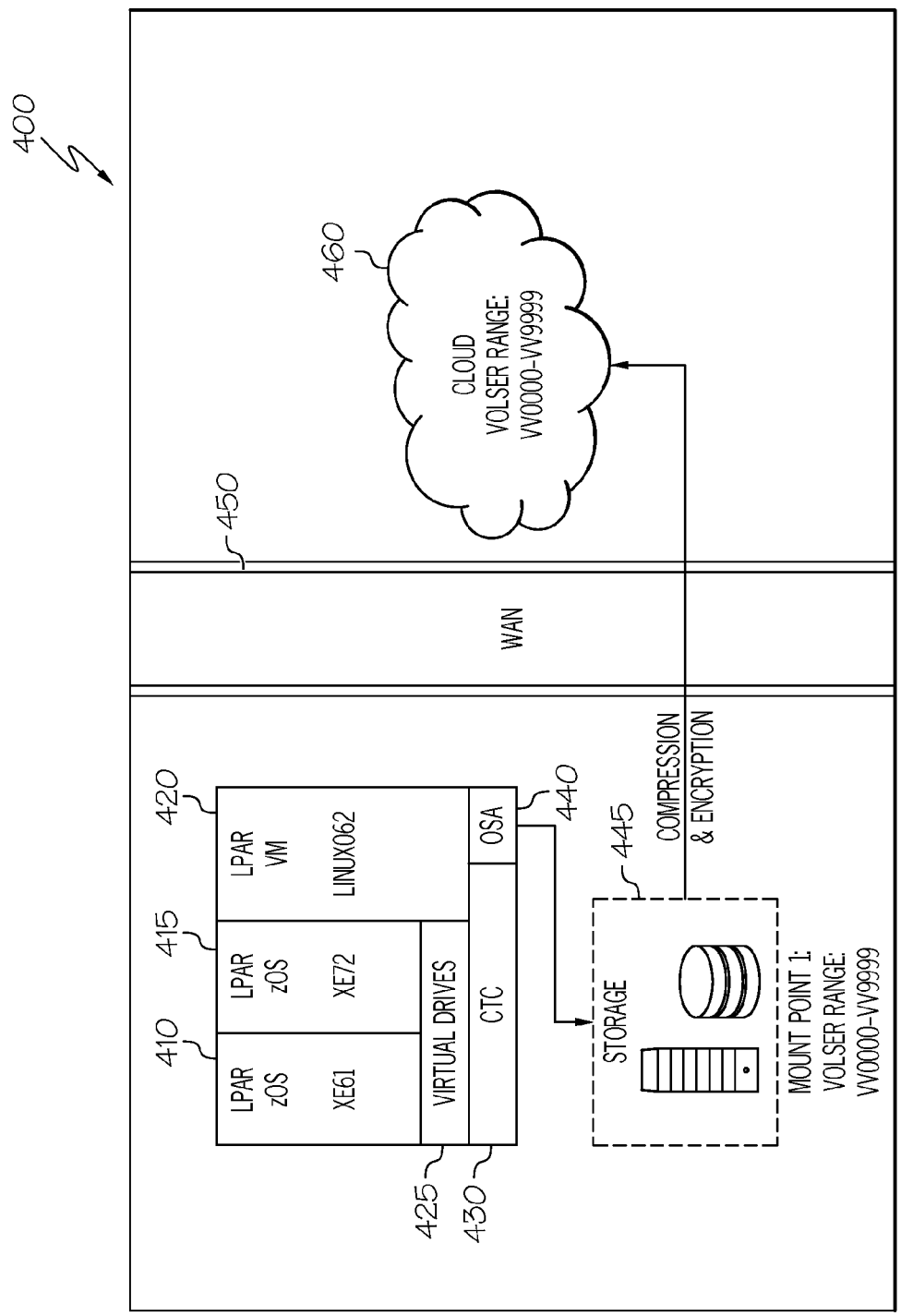
FIG. 4 illustrates a virtual tape cloud storage system implementing a system for transferring high volume data between operating systems in accordance with one particular non-limiting embodiment of the present disclosure.

With reference to FIG. 4, a virtual tape cloud storage system is shown implementing a system for transferring high-volume data between operating systems in accordance with one particular non-limiting embodiment of the present disclosure. z/OS LPAR 410 and z/OS LPAR 415 are shown sharing virtual drives and CTC connection addresses 430. Linux on Z LPAR 420 is also shown having CTC connection addresses 430, as well as an OSA adapter 440 for communicating with cloud storage appliance 445. Cloud storage appliance 445 may be connected via a Wide Area Network ("WAN") to a public cloud provider, such as Amazon S3® and/or Amazon Glacier®

In certain embodiments, virtual drives 425 may be virtual tape drives. Virtual tape drives may be a preferable storage mechanism, or a redundant storage mechanism. Virtual drives 425 may be configured such that they use special purpose engines, such as zIIP engines, to back up data from LPAR 410 and LPAR 415.

In certain embodiments, data is backed up from LPAR 410 and LPAR 415 through associated CTC addresses 430 to CTC addresses 430 that are associated with LPAR 420. Data may pass through CTC addresses 430 directly to other CTC addresses associated with another LPAR.

In certain embodiments, a CTC driver controls and optimizes the flow of data through CTC connections 430, such that rebuffering or caching the data is not required on LPAR 420 in order to export data to OSA 440 to cloud storage appliance 445.

In certain embodiments, cloud storage appliance 445 may de-duplicate refine and optimize data sent to it. Such processes may reduce the overall amount of data required to be transmitted across WAN 450 to cloud 460. This may result in reduced monthly storage costs for backup data as well as reduced cloud I/O fees. For example, some cloud data storage providers may charge based on the amount of data transmitted to and/or from the cloud provider. Reducing the amount of overall data sent to the cloud storage provider may reduce the fees associated with maintaining a public cloud backup facility.

Figure 5:
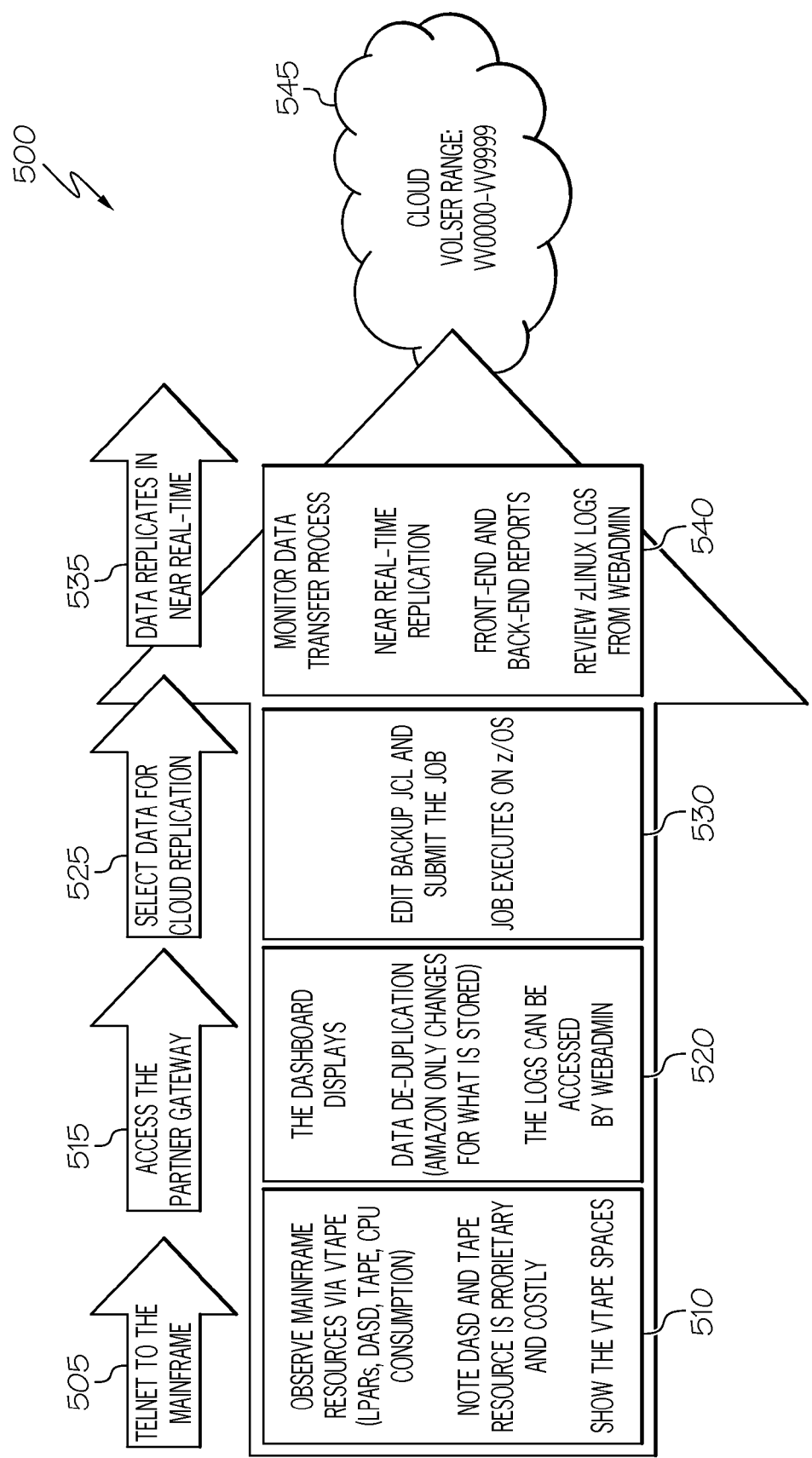
FIG. 5 illustrates a virtual tape cloud storage backup process flow diagram in accordance with one particular non-limiting embodiment of the present disclosure.

With reference to FIG. 5, a virtual tape cloud storage backup process flow is illustrated in accordance with one particular non-limiting embodiment of the present disclosure. The process illustrated in this diagram may show end user experience for using a virtual tape cloud storage backup process.

At step 505, a user Telnets to the mainframe to observe mainframe resources. At step 515, the user accesses the partner gateway to view logs and other information regarding the cloud storage appliance. At step 525, the user selects data for cloud replication and submits the job. The appliance runs the job on a connected z/OS LPAR. At step 535, data is replicated in real time and can be monitored via the cloud storage appliance.

Figure 6:
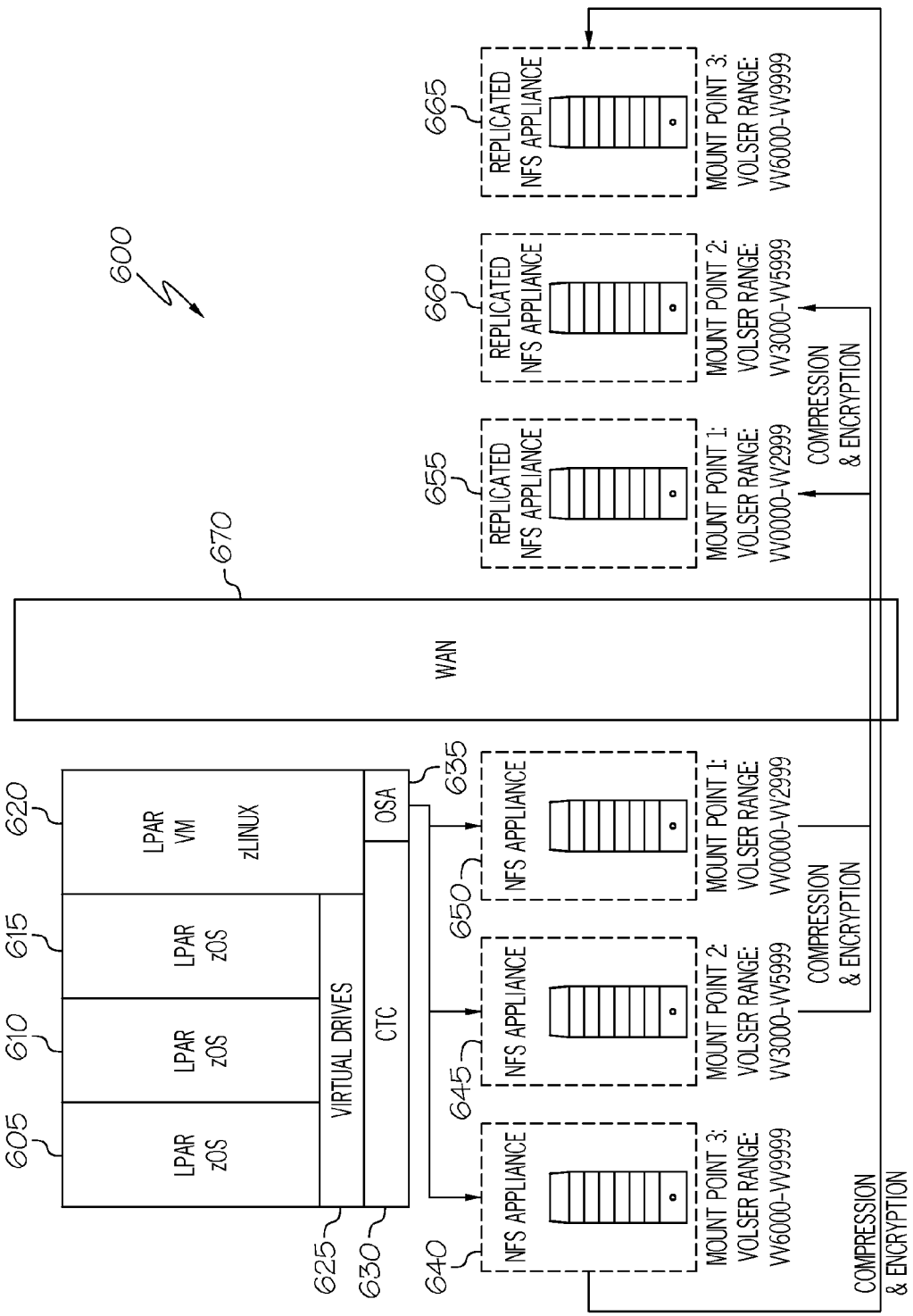
FIG. 6 illustrates a virtual tape cloud storage system implementing a system for transferring high volume data between operating systems in accordance with one particular non-limiting embodiment of the present disclosure.

With reference to FIG. 6, a scalable virtual tape cloud storage backup process is illustrated implementing a system for transferring high-volume data between operating systems. In certain embodiments, NFS appliance mount points may be duplicated to scale up data backup processes for many logical partitions. For example, z/OS LPAR's 605, 610 and 615 may have data backed up through Linux on z LPAR 620 using many local and remote NFS appliances.

With reference to teachings of the present disclosure, the term open storage disk includes small computer system interface ("SCSI") devices, serial access network ("SAN") devices, network-attached storage ("NAS") devices, and any other compatible devices. The term Linux on Z, or zLinux, may refer to hosts that run a version of Linux running on IBM's system z hardware platform.

In certain embodiments, virtual tape systems may be enhanced to provide access to one or more new cache types (e.g., open storage disk). Such new cache types will allow customers to implement tapeless virtual tape solutions, combining the benefits of tape systems with the flexibility of various cache types.

Certain embodiments may be programmed using one or more of a plurality of different programming languages. For example, CTC driver 22 and other components of system 100 from FIG. 1 may be programmed using Assembly language and/or Metal C.

Computationally intensive logic may be moved off of IBM System z hardware general processors onto specialty processors that may have access to open storage disk. In certain embodiments, data is moved between platforms using CTC connections. CTC connections may be highly scalable. For example, CTC addresses may be coupled together, thus increasing efficiency by minimizing data movement between data buffers.

Certain virtual tape systems operate on IBM's z/OS operating system. Virtual tape systems may emulate tape drives by intercepting input/output and redirecting the user's data to disk files. In certain embodiments, disk files can optionally be archived to a physical tape library at a later time, by another process.

Problems may arise during archiving due to the cost of the hardware that virtual tape solutions require. For example, a general processor may be used to archive data on a System z machine. However, a user may be billed for use of a general System z processor by the amount of use. For processor intensive operations such as archiving data, user of general processors to accomplish such tasks may be expensive.

IBM's z/OS operating system may only utilize disk devices that have count key data ("CKD") architectures. CKD architecture devices may be more expensive than open storage disk format devices which may include a SAN or NAS device architecture.

In certain embodiments, efficient methods for virtual tape systems to redistribute processing from z/OS processes to Linux on z processes are disclosed. Such methods may utilize less expensive open storage disk archive hardware, and may minimize use of expensive processors on z/OS.

In certain embodiments, algorithms allow multiple users to stream data across multiple CTC addresses to minimize data movement. For example, algorithms may minimize internal data buffering that may occur normally on a general processor. Thus, time, processing capacity, and/or money may be saved.

In certain embodiments, IBM's z/OS operating systems may not allow for adequate access to less expensive open storage disk. Embodiments of the present disclosure may provide a way for Linux on z hosts to provide surrogate access to open storage disks through CTC connections.

In certain embodiments, general processors available on System z hardware may be approximately 15 times more expensive than specialty engines. In some instances, users may only be charged for general processor utilization. Thus, specialty processors may be utilized to perform features of the general processors, such as data archiving. However, certain conditions may need to be met in order to perform these features on the specialty processor. The prerequisite conditions may vary based on the specialty processor in use. For example, Linux on z integrated facility for Linux ("IFL") specialty engines may be eligible to run most of and/or all of the work for the workload that runs on the Linux on z partition.

Virtual tape solutions may run most of its work on System z integrated information processors ("zIIP"). In certain embodiments of the present disclosure, the remaining work not done using zIIP processors that may be done by general processors may not be necessary anymore. Thus, overall processor utilization of virtual tape solutions and the remaining z/OS general processor utilization processes may mostly be accomplished on zIIP processors.

In certain embodiments, other processor intensive operations may be offloaded from the high-cost z/OS platform with general processors to the less expensive and/or more efficient Linux on z platform with IFL processors.

In certain embodiments, CKD devices may be emulated in addition to or instead of tape devices. New device types that do not yet exist on z/OS may also be emulated in future iterations of products associated with the teachings of the present disclosure.

In certain embodiments, data from multiple users may be efficiently exchanged between hosts. A suspend/resume mechanism provided in the channel subsystem may be utilized to coordinate data transfers between hosts. Bi-directional reading and writing capabilities provided with certain CTC programs may also be utilized in transferring data efficiently between hosts.

The z/OS Input Output Supervisor ("IOS") may control some, most, and/or all input/output instructions on z/OS systems. The IOS may rely on a channel command word ("CCW") architecture for sending data to and from input/output devices (e.g., hard disks, tape drives and networks interfaces). Buffers may be used for input/output operations may be fixed in storage for the duration of an input/output operation.

In certain embodiments, CCW's are used to point to buffers. These CCW's may be chained together to form a single channel program that is initiated for input/output. In certain embodiments, the start subchannel ("SSCH") instruction is used to initiate this configuration.

In certain embodiments, the channel subsystem may take control of the input/output operation and may use a specialty input/output processor ("IOP") to transfer data from main memory through the FICON connection to the destination host operating system. For example, the destination host operating system may be a Linux on z partition on the same hardware device. Data may be transferred from main memory on the z/OS partition to the Linux on z partition.

Open storage disk devices may not support CCW protocols. Further, open storage disk devices may not be able to be connected to z/OS hosts directly. No interface may exist to directly connect these devices.

Unlike z/OS, which also runs on system z, zLinux may be capable of reading from and writing to open storage disk using network file system ("NFS"), common internet file system ("CIFS"), and/or internet small computer system interface ("iSCSI") network protocols. Further, zLinux may be capable of reading from and writing to open storage disk devices directly using SCSI over fibre channel protocol ("FCP"). SCSI over FCP may be an open, standards-based alternative and supplement to fibre connection connections.

In certain embodiments, to allow z/OS hosts to access open storage disk devices, a CTC driver on both z/OS zLinux has been developed. The CTC driver may allow data to be moved between host memories in an efficient manner.

In certain embodiments, the CTC driver may allow a finite number of CTC addresses to exchange data on behalf of many users. Many users are accommodated through a multiplex design. Certain CTC addresses may be assigned responsibility for initiating data transfers. Other addresses may be assigned to respond.

In certain embodiments, CTC addresses may be freely assigned other than the initiator/response designation described above. For example, no other affinity may be assigned to CTC addresses other than the above described responsibilities and assignments. Thus, CTC addresses may transport data from many users without regard to completing a single data stream transfer.

For example, 4 CTC addresses may be configured between 2 hosts. 2 CTC addresses may be assigned to send data (i.e., initiate data transfers). 2 CTC addresses may be assigned to receive data. In certain embodiments of the present disclosure, the 4 CTC addresses could service hundreds of concurrent input/output requests from a variety of users and/or processes.

In certain embodiments, CTC drivers may utilize a suspend/resume mechanism of the channel subsystem. The CTC drivers may use this mechanism to utilize bidirectional reading and writing capabilities within the channel program. For example, the system initiating the SSCH may send a channel program comprised of a write CCW. The write CCW may be indicated in a header. The header may identify the data that is chained to a read CCW to capture the response from the other host. The write CCW may be followed by any number of write CCW's including the user's data to be transferred. In certain embodiments, a channel program executed in this manner may appear to execute without being interrupted.

In certain embodiments, the receiving host may be interrupted while the sending host is uninterrupted. For example, when the sending host initiates an SSCH, the receiving host is interrupted. The receiving host may respond with a sense command byte CCW. The sense command byte CCW may determine if a write CCW is pending.

In certain embodiments, a channel program may be used by the receiving system. The channel program may contain a read CCW for the header. The channel program may suspend the next CCW received until the header is read. After the header is read, an interrupt is generated. The interrupt may allow the receiving system to inspect the header to locate the proper data buffers to use. In certain embodiments, the input/output operations are resumed with a response write CCW command. The response write CCW command may be chained with any number of read CCW's. For example, the read CCW's may point to the data buffers that belong to the data owner.

In certain embodiments, the systems described in connection with the present disclosure may be designed to allow utilization of cloud storage for z/OS mainframe virtual tape volumes. Public cloud storage may provide advantages over traditional in-house manual tape storage systems. Public cloud storage may be elastic and may allow control over storage capacity instantaneously and/or automatically, rather than purchasing and configuring or removing physical hardware components.

Private cloud solutions may provide more control to users. For example, disaster recovery points and recovery time objectives are flexible. Resources can be configured to achieve any requirements.

In certain embodiments, cloud storage systems for System z are comprised of virtual tape systems on z/OS and an application server that runs on Linux on z partitions. The virtual tape system may offload tape data in real time to a Linux on z system over a CTC adapter using mainly zIIP engines. The Linux on z application server may provide input/output services to files that represent z/OS virtual volumes on standard filesystems. Standard filesystems may be intended to be on CIFS share and/or NFS mount points.

In certain embodiments, virtual volumes may be directed to a mount point by volume serial ranges. Such embodiments may provide flexibility to use one or more mount points by assigning ranges, such as volume serial ranges, to those mount points. One example virtual tape solution may assign virtual volume serial ranges through a data set and/or a data class policy, based on filters. Such embodiments may allow administrators to decide what z% OS applications and workloads get stored or backed up onto cloud storage.

In certain embodiments, a cloud storage program may be set up to utilize a cloud gateway appliance as a mount point. Cloud gateway appliances, such as open storage disk 50 from FIG. 1, may provide local storage, data compression, data de-duplication, data encryption, and access to public cloud storage facilities such as Amazon S3® and Glacier®.

In certain embodiments, a mount point storage facility may be accessed at local disk speeds. Only unique data may be stored in the cloud. For example, a cloud gateway appliance may be used to hold 100 terabytes ("TB") of uncompressed data which may reduce down to 10 TB of unique data. In this example, only the 10 TB representing the unique data may be stored in the cloud. Data de-duplication processes may further compress data using still other techniques.

In certain embodiments, data may be retained on a local disk cache for as long as possible. Local cache data may be evicted using algorithms. For example, the least recently used ("LRU") algorithm may be used to evict data from a memory cache (i.e., overwrite the memory space of the data with new data).

In certain embodiments, if the data is subsequently needed it may be retrieved from the cloud. The amount of local disk cache may be determined through a planning process. Appropriately sizing the local disk cache may minimize delays in retrieving data from the cloud by reducing misses and the latency associated with paging and loading data from the cloud.

In certain embodiments, a cloud storage system may be set up to utilize private cloud storage systems (i.e., on premise storage). Such appliances may provide mount point storage facilities. Such appliances may also provide additional services such as data compression, data de-duplication, data encryption, and data replication services. Mount point storage for private cloud appliances may be accessed at local disk speeds and capacity may be controlled by the storage appliance.

In certain embodiments, a hybrid cloud may be used in a cloud storage system. For example, tape data may be classified into three categories: work files, archives, and backups. The time relevance and importance of various categories of data may vary. For example, work files may not be needed after a few days while archive data may be needed for many years.

In certain embodiments, a cloud storage system can be setup to use a combination of public and private cloud storage (i.e., hybrid cloud). Virtual tape volser ranges may be represented by files that are placed in directories. Directories may all be on the same mount point and/or may be placed on different mount points.

In certain embodiments, a virtual tape solution may allow control over which volser ranges may be used by z/OS dataset name or SMS dataclass. Such embodiments may allow control over which storage appliance handles the data.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving, at a logical partition associated with a virtual tape storage system, a series of messages, each message in the series of messages including a respective block of data the logical partition associated with a general processor for transferring data;
   in response to receiving the first message of the series of messages, suspending further processing of the series of messages;
   identifying, from a header of the first message, a respective buffer address for each block of data, the buffer address corresponding to a buffer associated with a different logical partition;
   resuming processing of the series of messages; and
   for each respective block of data:
      storing the respective block of data at the respective buffer address; and
      transferring the respective block of data from the corresponding buffer address to an open storage disk using a special purpose engine, wherein a first billing rate for use of the special purpose engine is less than a second billing rate for use of the general processor.

2. The method of claim 1, wherein the series of messages received by the logical partition is sent by another logical partition configured to export data to the logical partition using an input/output processor ("IOP"), and wherein the logical partition transfers the respective blocks of data to the open storage disk using the special purpose engine.

3. The method of claim 1, wherein identifying a respective buffer address for each block of data is performed by the special purpose engine, storing the respective blocks of the data is performed by the special purpose engine, and transferring the respective blocks of data is performed by the special purpose engine.

4. The method of claim 1, wherein the open storage disk is provided in a virtual appliance configured to compress each respective block of data and transmit each respective block of data to a cloud storage provider.

5. The method of claim 2, wherein the logical partition comprises a Linux on System z operating system and the another logical partition comprises a z/OS operating system.

6. The method of claim 2, wherein the series of messages are sent from a first channel-to-channel address on the another logical partition, and the series of messages are received at a second channel-to-channel address on the logical partition.

7. The method of claim 1, wherein each message in the series of messages comprises a command channel word ("CCW") and each CCW, except for a last CCW in the series of messages, comprises a reference to a next respective CCW in the series of messages.

8. A computer configured to access a storage device, the computer comprising:
  a processor; and
  a non-transitory, computer-readable storage medium storing computer-readable instructions that when executed by the processor cause the computer to perform:
    receiving, at a logical partition associated with a virtual tape storage system, a series of messages, each message in the series of messages including a respective block of data, the logical partition associated with a general processor for transferring data;
    in response to receiving the first message of the series of messages, suspending further processing of the series of messages;
    identifying, from a header of the first message, a respective buffer address for each block of data, the buffer address corresponding to a buffer associated with a different logical partition;
    resuming processing of the series of messages; and
    for each respective block of data:
      storing the respective block of data at the respective buffer address; and
      transferring the respective block of data from the corresponding buffer address to an open storage disk, using a special purpose engine, wherein a first billing rate for use of the special purpose engine is less than a second billing rate for use of the general processor.

9. The computer of claim 8, wherein the series of messages received by the logical partition is sent by another logical partition configured to export data to the logical partition using an input/output processor ("IOP"), and wherein the logical partition transfers the respective blocks of data to the open storage disk using the special purpose engine.

10. The computer of claim 8, wherein identifying a respective buffer address for each block of data is performed by the special purpose engine, storing the respective blocks of the data is performed by the special purpose engine, and transferring the respective blocks of data is performed by the special purpose engine.

11. The computer of claim 8, wherein the open storage disk is provided in a virtual appliance configured to compress each respective block of data and transmit each respective block of data to a cloud storage provider.

12. The computer of claim 9, wherein the logical partition comprises a Linux on System z operating system and the another logical partition comprises a z/OS operating system.

13. The computer of claim 9, wherein the series of messages are sent from a first channel-to-channel address on the another logical partition, and the series of messages are received at a second channel-to-channel address on the logical partition.

14. The computer of claim 8, wherein each message in the series of messages comprises a command channel word ("CCW") and each CCW, except for a last CCW in the series of messages, comprises a reference to a next respective CCW in the series of messages.

15. A computer program product comprising:
  a non-transitory computer-readable storage medium having computer-readable program code embodied therewith, the computer-readable program code comprising:
    computer-readable program code configured to receive, at a logical partition associated with a virtual tape storage system, a series of messages, each message in the series of messages including a respective block of data, the logical partition associated with a general processor for transferring data;
    computer-readable program code configured to, in response to receiving the first message of the series of messages, suspend further processing of the series of messages;
    computer-readable program code configured to identify, from a header of the first message, a respective buffer address for each block of data, the buffer address corresponding to a buffer associated with a different logical partition;
    computer-readable program code configured to resume processing of the series of messages; and
    computer-readable program code configured to, for each respective block of data:
      store the respective block of data at the respective buffer address; and
      transfer the respective block of data from the corresponding buffer address to an open storage disk using a special purpose engine, wherein a first billing rate for use of the special purpose engine is less than a second billing rate for use of the general processor.

16. The computer program product of claim 15, wherein the series of messages received by the logical partition is sent by another logical partition configured to export data to the logical partition using an input/output processor ("IOP"), and wherein the logical partition transfers the respective blocks of data to the open storage disk using the special purpose engine.

17. The computer program product of claim 15, wherein identifying a respective buffer address for each block of data is performed by the special purpose engine, storing the respective blocks of the data is performed by the special purpose engine, and transferring the respective blocks of data is performed by the special purpose engine.

18. The computer program product of claim 15, wherein the open storage disk is provided in a virtual appliance configured to compress each respective block of data and transmit each respective block of data to a cloud storage provider.

19. The computer program product of claim 16, wherein the logical partition comprises a Linux on System z operating system and the another logical partition comprises a z/OS operating system.

20. The computer program product of claim 16, wherein the series of messages are sent from a first channel-to-channel address on the another logical partition, and the series of messages are received at a second channel-to-channel address on the logical partition.

* * * * *